United States Patent [19]

Costello

[11] Patent Number: 4,998,343

[45] Date of Patent: Mar. 12, 1991

[54] ELECTRICAL WIRING METHOD AND APPARATUS

[76] Inventor: Clifford T. Costello, 4959 San Molina, Sierra Vista, Ariz. 85635

[21] Appl. No.: 448,876

[22] Filed: Dec. 12, 1989

[51] Int. Cl.$^5$ .................... H01R 43/00; B23P 19/00
[52] U.S. Cl. ........................................ 29/857; 29/748; 29/755; 29/758; 29/759; 174/72 R; 174/72 A; 248/68.1; 361/428; 439/491
[58] Field of Search ................ 29/857, 760, 748, 759, 29/755, 758; 174/72 R, 72 A; 248/68.1; 361/428; 439/491

[56] References Cited

U.S. PATENT DOCUMENTS

| 1,551,954 | 9/1925 | Hodgart. | |
|---|---|---|---|
| 1,923,893 | 8/1933 | Smith | 175/298 |
| 2,140,376 | 12/1938 | Anderson | 361/428 |
| 3,087,984 | 4/1963 | Waranch | 174/135 |
| 3,989,338 | 11/1976 | Gosser. | |
| 4,514,028 | 4/1985 | Kuo. | |
| 4,679,123 | 7/1987 | Young | 174/72 A X |

FOREIGN PATENT DOCUMENTS

| 1187107 | 9/1959 | France. | |
|---|---|---|---|
| 768339 | 2/1957 | United Kingdom | 248/68.1 |

Primary Examiner—Carl E. Hall
Assistant Examiner—Carl J. Arbes
Attorney, Agent, or Firm—Cahill, Sutton & Thomas

[57] ABSTRACT

An apparatus for aiding the routing of conductors into an electrical panel distribution box and connecting the conductors to corresponding circuit breaker terminals of an electrical distribution panel therein. The apparatus includes a terminal jig having an upper surface, an array of number-coded holes extending through the first plate, a plurality of odd-number indicia on the upper surface adjacent to the holes, respectively, the holes each having a diameter greater than an outside diameter of the conductors, and a clamp for attaching the first plate to the distribution panel housing. A plurality of the number-coded conductors of the first group are pulled through a conduit into an interior of a distribution panel housing. The terminal jig is attached by the clamp to a lower front lip of the housing. The free ends of the conductors are inserted through correspondingly numbered holes in the terminal jig. The electrical power distribution panel is installed in the distribution panel housing. The conductors are withdrawn, one at a time, from the terminal jig and are electrically connected to correspondingly numbered terminals of circuit breakers of the electrical power distribution panel.

11 Claims, 3 Drawing Sheets

U.S. Patent    Mar. 12, 1991    Sheet 1 of 3    4,998,343
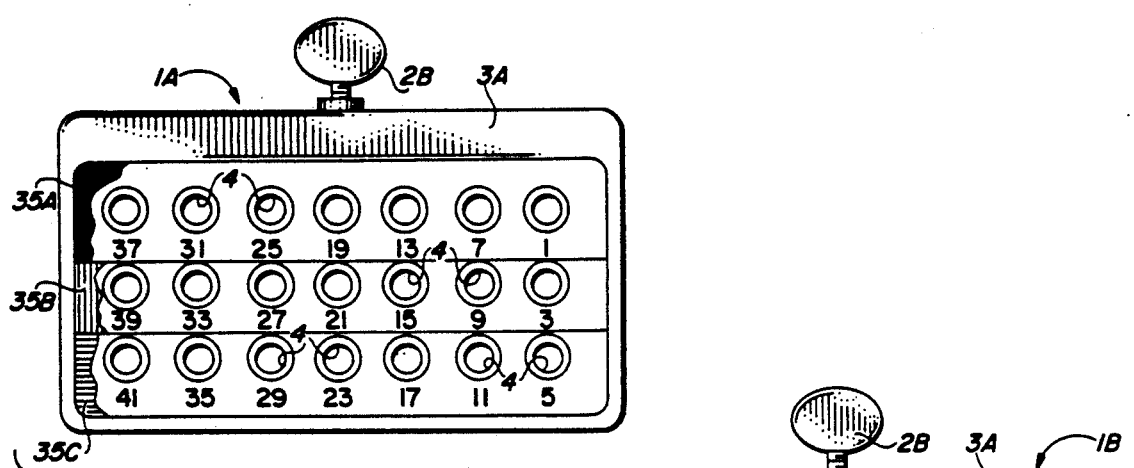
FIG. 1
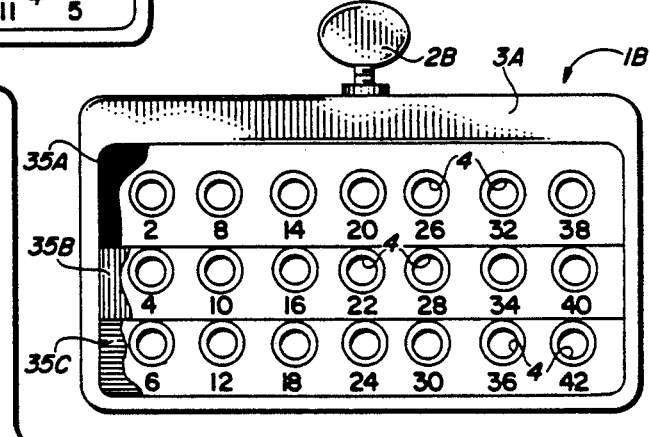
FIG. 2
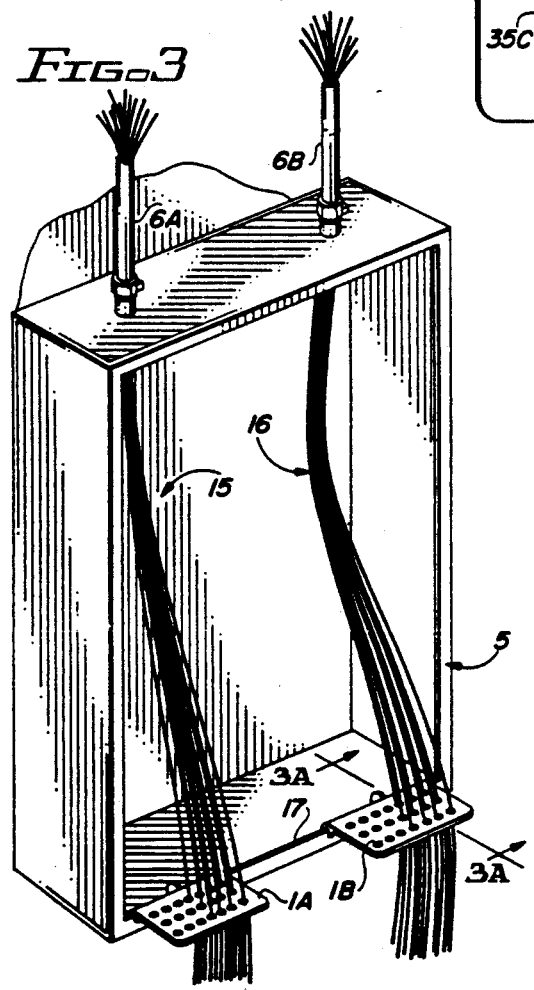
FIG. 3
FIG. 3A

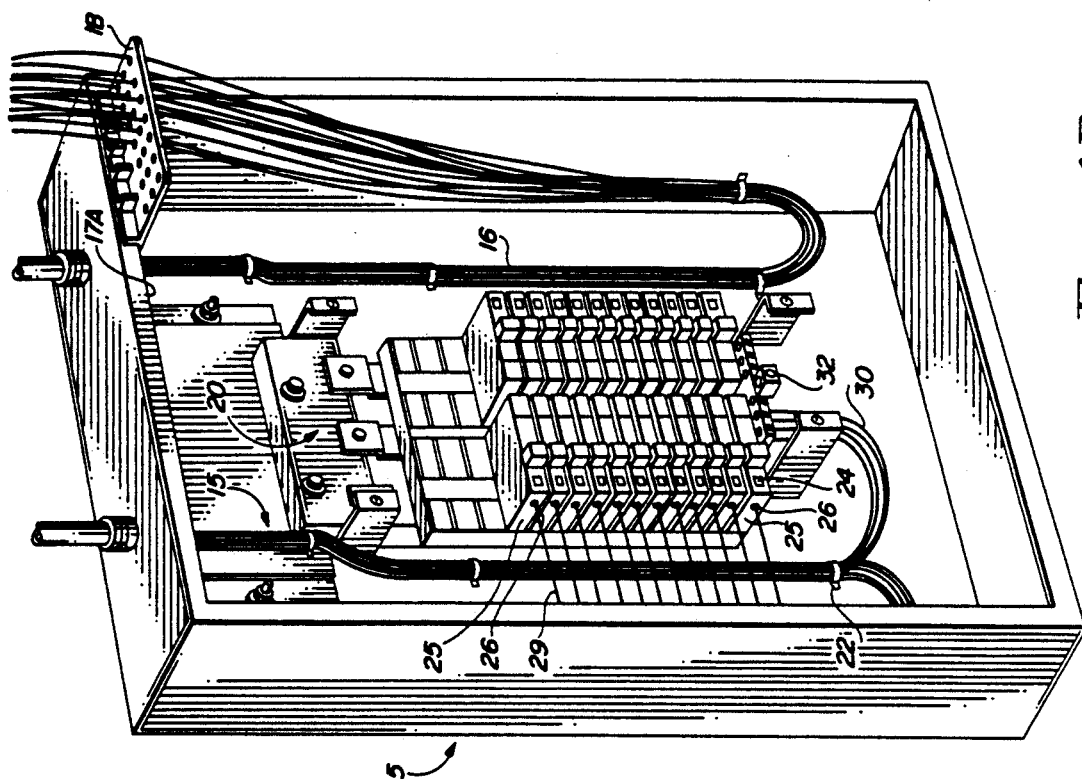
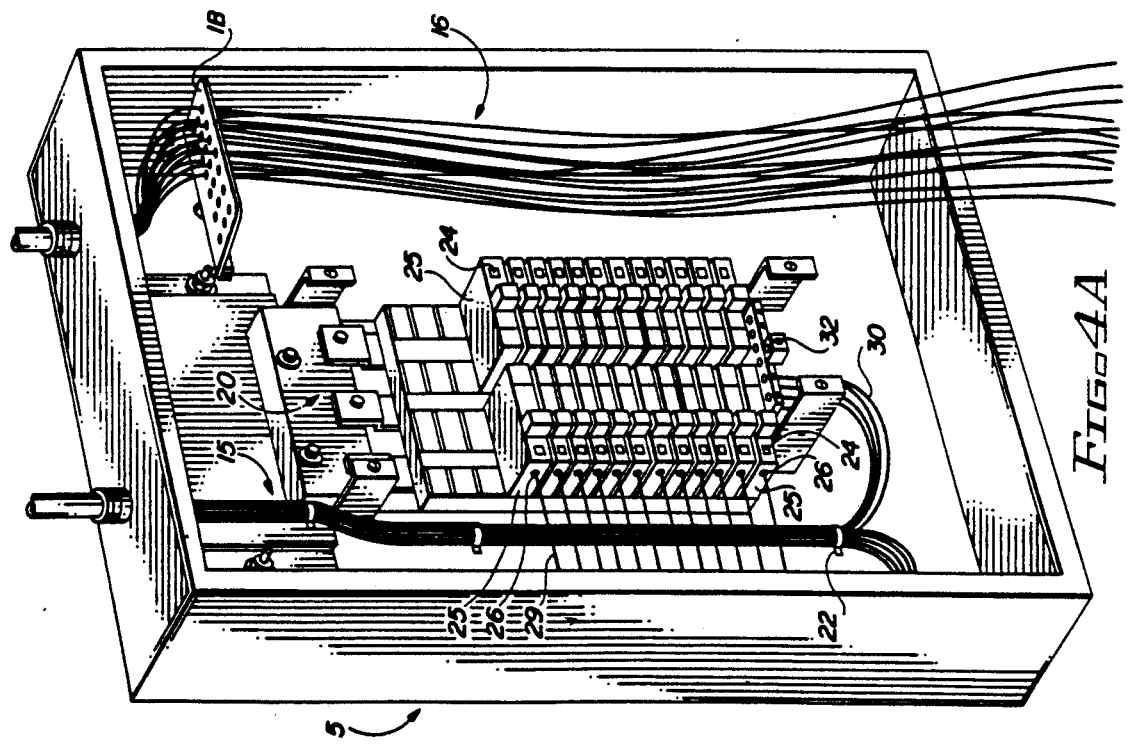

ELECTRICAL WIRING METHOD AND APPARATUS

BACKGROUND OF THE INVENTION

The invention relates to jigging apparatus and techniques for routing conductors from electrical conduits into a distribution panel housing and to terminals of circuit breakers in an electrical distribution panel therein.

Electricians generally pull electrical conductors, two or more at a time, through electrical conduits such as 6A and 6B in FIG. 3 and into a distribution panel housing such as 5. Generally, only three wire colors are used for 3-phase industrial applications, namely black, red, and blue, or brown, orange and yellow. The electrician usually knows precisely which wire code numbers have been assigned to the individual conductor or conductors that he presently is pulling through a conduit. The conventional practice is for the electrician to connect a tag with the assigned wire code number to each conductor as he pulls it into the housing. When the electrical distribution panel 20 (FIG. 5) containing a number of individual circuit breakers is installed, bare ends of each of the numbered wires will be inserted into corresponding terminal receptacles of the respective circuit breakers, to provide a neatly wired electrical distribution panel having an appearance generally as shown in FIG. 5. The procedure of attaching wire code number tags to each conductor is a time-consuming, wasteful procedure. Up to now, however, no one has found a way to avoid it.

SUMMARY OF THE INVENTION

Accordingly, it is an object of the invention to provide an improved apparatus and method for eliminating the necessity for attaching numbered tags to conductors which are later to be connected to numbered connectors.

It is another object of the invention to provide an improved apparatus and method for eliminating the necessity for attaching numbered tags to electrical wires as they are pulled into an electrical distribution panel housing.

Briefly described, and in accordance with one embodiment thereof, the invention provides an apparatus for aiding the routing of conductors into a panel distribution housing and connecting the conductors to corresponding circuit breaker terminals of an electrical distribution panel therein, including a first terminal jig including a first plate having an upper surface, an array of number-coded holes extending through the first plate, a plurality of odd-number indicia on the upper surface adjacent to the holes, respectively, the holes each having a diameter greater than an outside diameter of the conductors, and a clamp for attaching the first plate in a generally fixed relationship to the electrical panel distribution box. The apparatus also includes a second terminal jig including a second plate having an upper surface, an array of number-coded holes extending through the second plate, a plurality of even-number indicia on the upper surface adjacent to the holes, respectively, the holes each having a diameter greater than an outside diameter of the conductors, and a clamp. Use of the apparatus includes pulling the number-coded conductors of the first group through a first conduit into an interior of a distribution panel housing, holding the first terminal jig in generally fixed relationship to the distribution panel box, and inserting free ends of the conductor or conductors through correspondingly numbered holes in the first terminal jig. The electrical power distribution panel then is installed in the distribution panel housing. The electrical power distribution panel includes a number of circuit breakers having a plurality of terminals numbered correspondingly to the number-coded conductors. The free ends of the conductors are withdrawn from the first terminal jig and electrically connected to correspondingly numbered terminals of the circuit breakers.

BRIEF DESCRIPTION OF THE DRAWINGS

FIG. 1 is a plan view of a left terminal jig and a right terminal jig according to the invention.

FIG. 2 is a plan view of a bottom surface of the left terminal jig of FIG. 1.

FIG. 3 is a perspective view of the interior of a distribution panel housing useful for illustrating use of the invention.

FIG. 3A is a section view through section line 3A—3A of FIG. 3.

FIGS. 4A and 4B are perspective views of the box of FIG. 4 illustrating a further step in the method of the invention.

DETAILED DESCRIPTION OF THE PREFERRED EMBODIMENT

Figure 5:
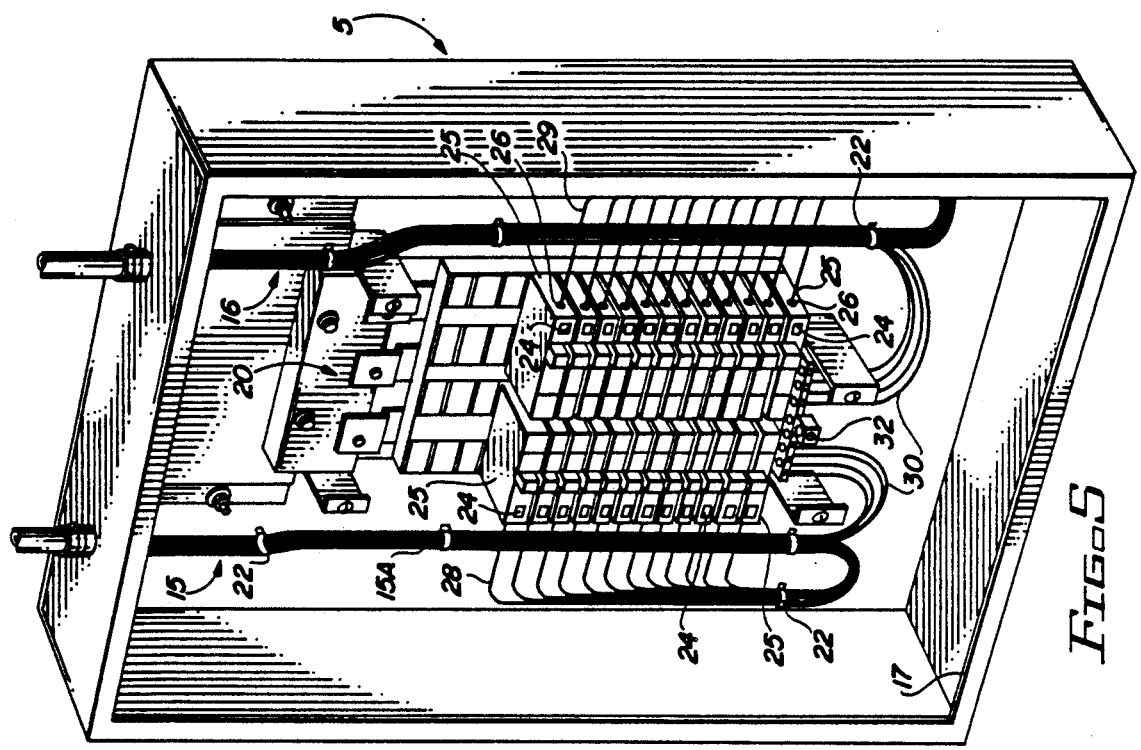
FIG. 5 is a perspective view of the box of FIG. 3 with the electrical distribution panel installed therein and the electrical conductors bundled and routed to appropriate circuit breaker receptacle terminals.

Referring to the drawings, particularly FIGS. 1 and 2, left terminal jig 1A includes an upper surface 3A with 21 holes 4 therein, arranged in three rows of 7 each. The upper row of holes 4 is color-coded by means of a black band 35A. The middle row is color-coded red by a red band 35B, and the bottom row of holes 4 is color-coded blue by a blue band 35C. Of course, other color-coding schemes than colored bands can be used. (For example, black circles or other black indicia can be provided to designate each of the holes 4 of the upper row as being "black" holes.)

Each of the holes 4 in left hand terminal jig 1A is assigned an odd number between 1 and 41 in the manner indicated. When the jig 1A or 1B is rotated and clamped to the top front edge lip of the panel box 5 (FIG. 3), as subsequently described with reference to FIG. 4A, the numbering arrangement results in the even-numbered or odd-numbered conductors being easily, neatly aligned with their correspondingly-numbered circuit breaker terminals.

FIG. 2 shows the bottom surface 2B of left terminal jig 1A, where it can be seen that there are two rails 10A and 10B extending upward from the bottom surface 2B adjacent to edge 13 and defining a narrow slot 11 therebetween. A thumbscrew 3 extends into a threaded hole in rail 10A, allowing the left terminal jig 1A to be clamped to the front lip 17 (FIG. 3) of distribution panel box 5.

Similarly, right terminal jig shown in FIG. 1 is identical in construction to left terminal jig 1A, except that the holes are assigned even numbers between 2 and 42, rather than odd numbers.

Figure 4:
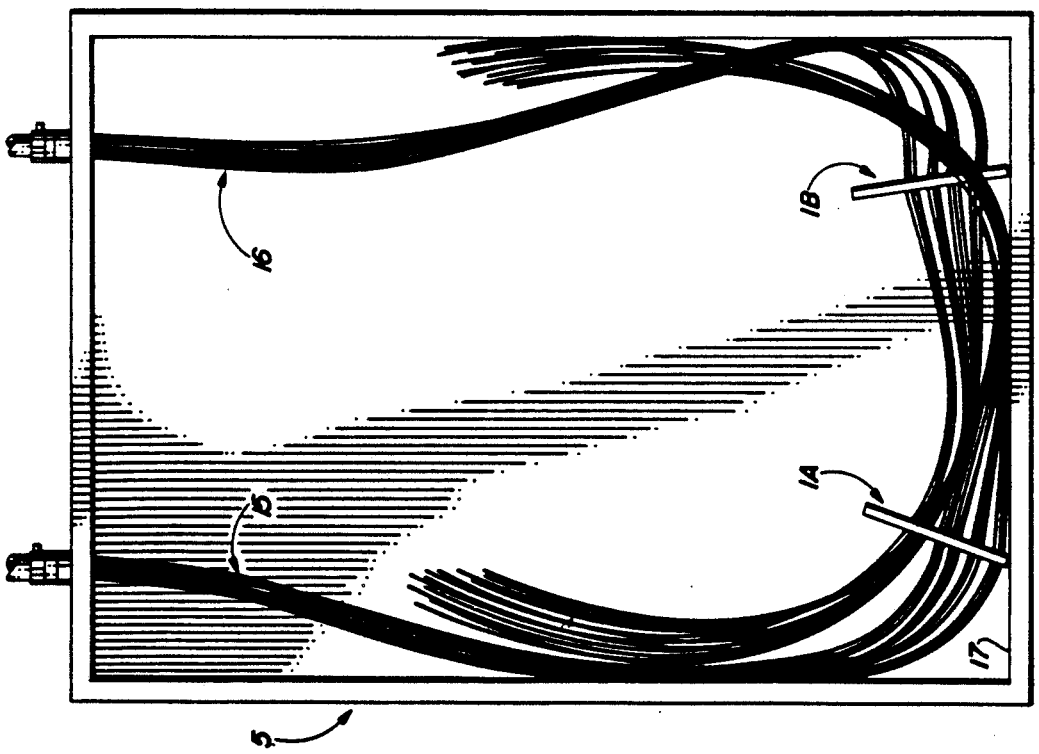
FIG. 4 is an elevation view of the electrical distribution panel box of FIG. 3 illustrating a further step in the method of the invention.

Next, the method of using the terminal jigs 1A and 1B is illustrated with reference to FIGS. 3-5. The terminal jigs 1A and 1B are clamped to the lower front edge lip 17, as shown in FIG. 3, by means of thumbscrew 3 in the slot 11 in each. Then, the electrician, knowing the preassigned number of each conductor, pulls groups of two or more of the conductors 15 through conduit 6A. The free end of each conductor is inserted through the correspondingly number-coded hole of left terminal jig 1A. The color-coded bands facilitate the insertion process.

Similarly, even-numbered conductors are pulled by the electrician through right conduit 6B, and the free ends of these conductors are inserted into correspondingly numbered holes 4 of right terminal jig 1B, resulting in the structure shown in FIG. 3.

Ordinarily, the electrical interior panel 20 is not yet installed at that time, and may be installed later by a different electrician. If desired, the electrician may loosen the clamp screws 3, and position the terminal jigs 1A and 1B in the free ends of the conductors 15 and 16 inside the housing 5 as shown in FIG. 4, and attach a temporary cover plate (not shown) over the face of the distribution panel housing 5.

Later, an electrician installs electrical interior panel assembly 20, which can include a large number of circuit breakers 25, as shown in FIG. 5. Each circuit breaker in the left column has a number-coded terminal receptacle into which the end of one of the left conductors 15 can be inserted. Similarly, each of the right circuit breakers has a numbered terminal receptacle into which the end of one of the insulated right conductors 16 can be inserted. The code number of each circuit breaker is indicated by numbered labels 24. (The white neutral conductors 30 are not numbered, and are not involved in the invention.)

The next step in the method is for the electrician to neatly group the conductors of groups 15 and 16, respectively, together, starting at the upper ends at which the conductors extend down from the electrical conduits 6A and 6B into the distribution panel housing 5, and then tie the neatly grouped conductors together by plastic ties such as 22. The electrician can accomplish this by disconnecting the jig 1B from the bottom lip 17 and sliding it up along the wires 16 as shown in FIG. 4A to, in effect, separate and organize them in accordance with their assigned numbers. Then jig 1B is slid back down toward the free ends of the conductors 16.

The jig 1B then is rotated counterclockwise 180 degrees and raised to the top of box 5 and clamped to a top front lip 17A, as shown in FIG. 4B. The same procedure is repeated for jig 1A and conductors 15.

Then, one at a time, the electrical conductors of groups 15 or 16 are individually pulled out of the terminal jig 1A or 1B and their bare ends (from which the colored electrical insulation has been stripped) are inserted into the correspondingly numbered circuit breaker terminal receptacles to produce the final structure shown in FIG. 5. The arrangement shown in FIG. 4B results in the electrician being able to conveniently, neatly remove the individual odd-numbered conductors from the inverted jig 1B in the order in which they are connected, from the bottom up, to the corresponding circuit breaker terminal receptacles, to thereby provide the neat arrangement shown in FIG. 5.

The above described terminal jigs and method have been found to result in a great deal of time savings and also has been found to greatly reduce the number of wiring errors produced when the conventional technique of attaching numbered tags to the individual conductors is used. It has been found that in most cases there is no need for "closed circuit testing" to make sure that all of the electrical connections have been properly made to the electrical distribution panel assembly 20.

While the invention has been described with reference to a particular embodiment thereof, those skilled in the art will be able to make the various modifications to the described embodiment of the invention without departing from the true spirit and scope of the invention. For example, the technique described herein can be used for many applications that require routing of numbered or coded conductors of a variety type for connection or coupling to correspondingly numbered or coded connection points.

What is claimed is:

1. A method of routing and connecting a first group of number-coded electrical conductors to an electrical power distribution panel in a housing, the method comprising the steps of:
    (a) pulling at least one of a plurality of the number-coded conductors of the first group through a first conduit into an interior of a distribution panel housing;
    (b) holding a reusable first terminal jig having a plurality of numbered-coded holes therethrough in generally fixed relationship to the distribution panel housing;
    (c) inserting free ends of the conductor or conductors through correspondingly numbered holes in the first terminal jig;
    (d) repeating steps (a) through (c) for additional conductors of the first step until all of the conductors of the first group have been pulled through the first conduit into the interior of the distribution panel housing and inserted through corresponding number-coded holes in the first terminal jig;
    (e) installing the electrical power distribution panel in the distribution panel housing, the electrical power distribution panel including a number of circuit breakers having a plurality of terminals number-coded correspondingly to the
    (f) withdrawing the conductors from the first terminal jig and electrically connecting them to correspondingly number-coded terminals of the circuit breakers;
    (g) removing the first terminal jig from the vicinity of the electrical power distribution panel and the housing.

2. The method of claim 1 wherein the first group includes odd-number coded conductors, and the holes through the first terminal jig are odd number-coded corresponding to the odd number-coded conductors, the method including repeating steps (a)-(d) for a plurality of even-number coded conductors of a second group and inserting free ends thereof into corresponding even-number coded holes through a reusable second terminal jig, respectively, before performing step (e).

3. The method of claim 1 wherein the first terminal jig includes a clamp mechanism attached to an edge of the first terminal jig, and wherein step (b) includes clamping the first terminal jig to a flange of the housing and step (g) includes unclamping the first terminal jig from the flange.

4. A reusable wire routing tool for aiding the routing of conductors into a distribution panel housing and connecting the conductors to corresponding circuit breaker terminals of an electrical distribution panel therein, comprising in combination:
  (a) a plate having an upper surface;
  (b) an array of number-coded holes extending through the plate;
  (c) a plurality of number-code indicia on the upper surface adjacent to the holes, respectively, the holes each having a diameter greater than an outside diameter of the conductors;
  (d) means for attaching the first plate in a generally fixed relationship to the distribution panel housing and detaching the first plate from the generally fixed relationship to the distribution panel housing.

5. The reusable wire routing tool of claim 4 wherein the holes are arranged in first, second, and third rows.

6. The reusable wire routing tool of claim 5 wherein the first row is color-colored black, the second row is color-coded red, and the third row is color-coded blue.

7. A pair of reusable wire routing tools for aiding the routing of conductors into a distribution panel housing and electrically connecting the conductors to corresponding circuit breaker terminals of an electrical distribution panel therein, comprising in combination:
  (a) a left terminal jig including
    i. a first plate having an upper surface,
    ii. an array of number-coded holes extending through the first plate,
    iii. a plurality of odd-number indicia on the upper surface adjacent to the holes, respectively, the holes each having a diameter greater than an outside diameter of the conductors,
    iv. means for attaching the first plate in a generally fixed relationship to the distribution panel housing and detaching the first plate from the generally fixed relationship to the distribution panel housing;
  (b) a right terminal jig including
    i. a second plate having an upper surface,
    ii. an array of number-coded holes extending through the second plate,
    iii. a plurality of even-number indicia on the upper surface of the second plate adjacent to the holes therein, respectively, the holes of the second plate each having a diameter greater than an outside diameter of the conductors;
    iv. means for attaching the second plate in a generally fixed relationship to the distribution panel housing and detaching the second plate from the generally fixed relationship to the distribution panel housing.

8. The pair of reusable wire routing tools of claim 7 wherein the holes in the plates of each of the left and right terminal jigs are arranged in first, second, and third rows of seven holes each.

9. The pair of reusable wire routing tools of claim 8 wherein in the plate of the left terminal jig, the number indicia include even numbers 1 through 41, arranged in right-to-left order of 1, 7, 13, 19, 25, 31, 37 for the first row, 3, 9, 15, 21, 27, 33, 39 for the second row, and 5, 11, 17, 23, 29, 35, and 41 for the third row, and wherein in the plate of the right terminal jig, the number indicia include odd numbers 2 through 42 arranged in the first, second, and third rows in left-to-right order of 2, 8, 14, 20, 26, 32, 38 for the first row, 4, 10, 16, 22, 28, 34, 40 for the second row, and 6, 12, 18, 24, 30, 36, 42 for the third row.

10. The pair of reusable wire routing tools of claim 9 wherein the attaching means of each of the left and right terminal jigs includes a clamp mechanism attached to an edge adjacent to the first row of that terminal jig, the clamp mechanism being adapted to engage a front flange of the distribution panel housing.

11. The pair of reusable wire routing tools of claim 10 wherein for both the left terminal jig and the right terminal jig, the first row is color-coded black, the second row is color-coded red, and the third row is color-coded blue.

* * * * *